US012596204B2

(12) United States Patent
Rho et al.

(10) Patent No.: US 12,596,204 B2
(45) Date of Patent: Apr. 7, 2026

(54) META OPTICAL DEVICE AND ELECTRONIC DEVICE INCLUDING THE SAME

(71) Applicant: SAMSUNG ELECTRONICS CO., LTD., Suwon-si (KR)

(72) Inventors: Junsuk Rho, Pohang-si (KR); Gyeongtae Kim, Pohang-si (KR); Yeseul Kim, Pohang-si (KR); Jooyeong Yun, Pohang-si (KR); Inki Kim, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 313 days.

(21) Appl. No.: 18/471,825

(22) Filed: Sep. 21, 2023

(65) Prior Publication Data

US 2024/0118455 A1      Apr. 11, 2024

(30) Foreign Application Priority Data

Sep. 30, 2022    (KR) ........................ 10-2022-0125818
Apr. 26, 2023    (KR) ........................ 10-2023-0055011

(51) Int. Cl.
| | |
|---|---|
| *G02B 1/00* | (2006.01) |
| *G02B 27/01* | (2006.01) |
| *G06T 7/521* | (2017.01) |
| *G06T 7/593* | (2017.01) |

(52) U.S. Cl.
CPC ......... *G02B 1/002* (2013.01); *G02B 27/0172* (2013.01); *G06T 7/521* (2017.01); *G06T 7/593* (2017.01); *G06T 2207/10028* (2013.01)

(58) Field of Classification Search
CPC .. G02B 1/002; G02B 27/0172; G02B 5/1809; G02B 5/1876; G02B 27/18; G06T 7/521;
(Continued)

(56) References Cited

U.S. PATENT DOCUMENTS

| | | | |
|---|---|---|---|
| 10,402,993 B2 | 9/2019 | Han et al. | |
| 10,521,926 B1 | 12/2019 | De Nardi et al. | |

(Continued)

FOREIGN PATENT DOCUMENTS

| | | | |
|---|---|---|---|
| KR | 10-2017-0112915 A | 10/2017 | |
| KR | 10-2018-0015489 A | 2/2018 | |

(Continued)

OTHER PUBLICATIONS

Raghuram Dharmavarapu, "Improved Techniques for Complex Light Generation using Diffractive and Meta-surfaces", Department of Electrical Engineering Indian Institute of Technology Madras, Jan. 25, 2020 (132 pages).

(Continued)

*Primary Examiner* — Collin X Beatty
(74) *Attorney, Agent, or Firm* — Sughrue Mion, PLLC

(57) ABSTRACT

A meta optical device for forming structured light by modulating incident light having a preset wavelength includes a plurality of supercells each including a plurality of nanostructures having a shape dimension less than the preset wavelength, and shapes and arrangements of the plurality of nanostructures are designed to form the structured light as a point pattern having a viewing angle greater than 160° in horizontal and vertical directions.

8 Claims, 17 Drawing Sheets

(58) Field of Classification Search

CPC .......... G06T 7/593; G06T 2207/10028; G01B 11/2513

See application file for complete search history.

(56) References Cited

U.S. PATENT DOCUMENTS

| | | | |
|---|---|---|---|
| 10,895,752 B1 | 1/2021 | Romano et al. | |
| 11,067,877 B2 | 7/2021 | Park et al. | |
| 11,852,840 B2 | 12/2023 | Moon et al. | |
| 2012/0105855 A1* | 5/2012 | Miyasaka | G02B 27/4233 |
| | | | 359/569 |
| 2017/0134717 A1 | 5/2017 | Trail et al. | |
| 2021/0044748 A1 | 2/2021 | Hu et al. | |
| 2021/0306564 A1 | 9/2021 | Hu et al. | |

FOREIGN PATENT DOCUMENTS

| | | | | |
|---|---|---|---|---|
| KR | 10-2018-0066116 A | | 6/2018 | |
| KR | 20220000787 A | * | 1/2022 | ........... G02B 3/0056 |
| KR | 10-2022-0077724 A | | 6/2022 | |

OTHER PUBLICATIONS

Korean Office Action dated Mar. 6, 2024 in Application No. 10-2023-0055011.

Dong Kyo Oh, et al., "Nanoimprint lithography for high-throughput fabrication of metasurfaces", Front. Optoelectron, 2021, vol. 14, No. 2, pp. 229-251 (23 pages).

Extended European Search Report dated Mar. 12, 2024 in Application No. 23196407.3.

Yibo Ni et al., "Metasurface for Structured Light Projection over 120 Field of View", NANO Letters, 2020, vol. 20, pp. 6719-6724.

Seung-Hwan Baek et al., "Polka Lines: Learning Structured Illumination and Reconstruction for Active Stereo", Princeton University, May 26, 2021, pp. 1-10.

"Structured Light DOEs", Holo or a Vision of Excellence, 2 Pages.

Zile Li et al., "Full-Space Cloud of Random Points with a Scrambling Metasurface", Light: Science & Applications, 2018, vol. 7, No. 63, pp. 1-8.

Seung-Hwan Baek et al., "Polka Lines: Learning Structured Illumination and Reconstruction for Active Stero", Princeton University, 2021, pp. 5753-5763.

* cited by examiner

FIG. 1

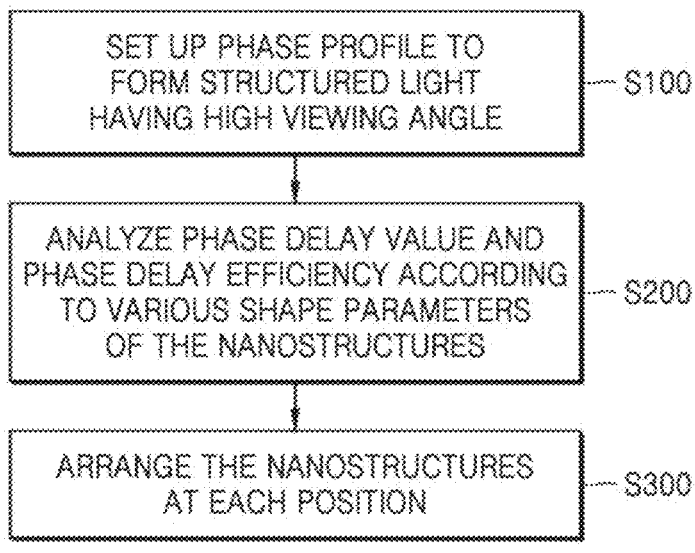

SET UP PHASE PROFILE TO
FORM STRUCTURED LIGHT
HAVING HIGH VIEWING ANGLE — S100

ANALYZE PHASE DELAY VALUE AND
PHASE DELAY EFFICIENCY ACCORDING
TO VARIOUS SHAPE PARAMETERS
OF THE NANOSTRUCTURES — S200

ARRANGE THE NANOSTRUCTURES
AT EACH POSITION — S300

FIG. 2

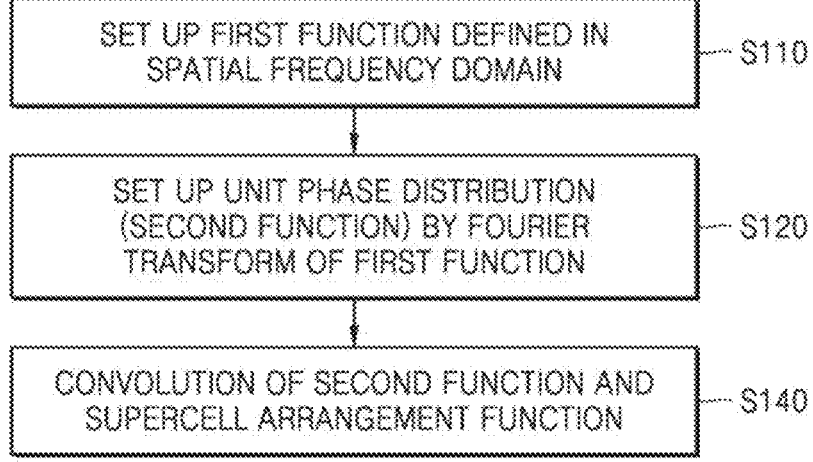

SET UP FIRST FUNCTION DEFINED IN
SPATIAL FREQUENCY DOMAIN — S110

SET UP UNIT PHASE DISTRIBUTION
(SECOND FUNCTION) BY FOURIER
TRANSFORM OF FIRST FUNCTION — S120

CONVOLUTION OF SECOND FUNCTION AND
SUPERCELL ARRANGEMENT FUNCTION — S140

Normalized intensity [arb. units]

FOV 2ω

META OPTICAL DEVICE AND ELECTRONIC DEVICE INCLUDING THE SAME

CROSS-REFERENCE TO RELATED APPLICATION

This application is based on and claims priority under 35 U.S.C. § 119 to Korean Patent Application Nos. 10-2022-0125818, filed on Sep. 30, 2022, and 10-2023-0055011, filed on Apr. 26, 2023, in the Korean Intellectual Property Office, the disclosures of which are incorporated by reference herein in their entireties.

BACKGROUND

The inventive concept relates to a meta optical device and an electronic device including the same.

This invention was supported by Samsung Research Funding & Incubation Center of Samsung Electronics under Project Number SRFC-IT1901-52.

Recently, object recognition for humans and other objects has been performed using a three-dimensional sensing technology using structured light for precise three-dimensional shape recognition by depth recognition.

Structured light is light having a specific preset pattern, and a pattern change occurs when the light of the pattern is reflected from a three-dimensional object. Depth information about the object to which structured light is irradiated may be obtained from such a pattern change.

For generating structured light, a diffractive optical element (DOE) has been generally used, but the diffraction efficiency of the DOE decreases as the diffraction angle increases. Therefore, it is difficult for a depth recognition system using a DOE as a transmitter to have a wide viewing angle. Accordingly, there has been s need for various manners to form structured light with a wide viewing angle.

SUMMARY

The inventive concept provides a meta optical device and an electronic device including the same.

According to an aspect of the inventive concept, there is provided a meta optical device for forming structured light by modulating incident light having a preset wavelength including a plurality of supercells each including a plurality of nanostructures each having a shape dimension less than the preset wavelength, wherein shapes and arrangements of the plurality of nanostructures are configured to form the structured light as a point pattern having a viewing angle greater than 160° in horizontal and vertical directions.

In an example embodiment, the shapes and the arrangements of the plurality of nanostructures may be designed such that a ratio of an intensity of an $m^{th}$ order diffraction light with respect to the intensity of a first order diffraction light is greater than about 50%. Herein, m may denote a largest number of integers less than $(n*P/\lambda)$, the nanostructures may be arranged in a matrix of $n \times n$ in a single supercell, and P may denote an arrangement pitch of the nanostructures in each of the supercells.

A phase profile generated by each of the plurality of supercells may be represented as a second function that is obtained by an iterative Fourier transform of a first function defined in a spatial frequency domain, and the first function may be defined to have a value of 1 within a circle with radius $1/\lambda$ and a value of 0 in a remaining space in the spatial frequency domain defined by (fx, fy) satisfying conditions $1/(2P) \le fx \le 1/(2P)$, $1/(2P) \le fy \le 1/(2P)$, wherein P denotes an arrangement pitch of the nanostructures and $\lambda$ denotes the preset wavelength.

The arrangement pitch of the plurality of nanostructures may be less than or equal to $\lambda/2$ ($\lambda$ is the preset wavelength).

Each of the plurality of nanostructures may be shaped into a column having a cross-sectional surface defined by a major axis and a minor axis, and a direction of the major axis of each of the plurality of nanostructures may be determined by a relative position of the nanostructure in each of the plurality of supercells.

The metal optical device may further include a support layer supporting the plurality of nanostructures.

Each of the plurality of nanostructures may include a nanocomposite having a resin material and nanoparticles dispersed in the resin material.

The meta optical device may be manufactured by using a soft mold having a reverse pattern of the shapes of the plurality of nanostructures.

The support layer may include a transparent plastic material having a curved shape.

According to another aspect of the inventive concept, there is provided a meta optical device including a plurality of supercells each including a plurality of nanostructures and periodically arranged, wherein a phase profile generated by each of the plurality of supercells is represented as a second function that is obtained by an iterative Fourier transform of a first function defined in a spatial frequency domain, and the first function may be defined to have a value of 1 within a circle with radius $(\sin \omega)/\lambda$ and a value of 0 in a remaining space in the spatial frequency domain defined by (fx, fy) satisfying conditions $1/(2P) \le fx \le 1/(2P)$, $1/(2P) \le fy \le 1/(2P)$, wherein w denotes a value less than or equal to $\pi/2$, P denotes an arrangement pitch of the nanostructures, and $\lambda$ denotes the preset wavelength.

$\omega$ may be a $\pi/2$ radian.

The arrangement pitch of the plurality of nanostructures may be less than or equal to $\lambda/2$.

Each of the plurality of nanostructures may be shaped into a column having a cross-sectional surface defined by a major axis and a minor axis, and a direction of the major axis of each of the plurality of nanostructures may be determined by a relative position of the nanostructure in each of the plurality of supercells.

The meta optical device may further include a support layer supporting the plurality of nanostructures.

Each of the plurality of nanostructures may include a nanocomposite having a resin material and nanoparticles dispersed in the resin material.

The support layer may include a transparent plastic material having a curved shape.

According to another aspect of the inventive concept, there is provided a meta optical device including a plurality of supercells each including a plurality of nanostructures arranged periodically, wherein a phase profile generated by each of the plurality of supercells is represented as a second function that is obtained by an iterative Fourier transform of a first function defined in a spatial frequency domain, and the first function may be defined to have a value of 1 within a circle with radius $(\sin \omega_1)/\lambda$, a value of 1 in at least an annular ring with an inner diameter of $(\sin \omega_2)/\lambda$ and an outer diameter of $(\sin \omega_3)/\lambda$, and value of 0 in a remaining space in the spatial frequency domain defined by $(f_x, f_y)$ satisfying conditions $1/(2P) \le f_x \le 1/(2P)$, $1/(2P) \le f_y \le 1/(2P)$, wherein $\omega_1$, $\omega_2$, and $\omega_3$ have relations of $\omega_1 < \omega_2 < \omega_3 \le \pi/2$, P denotes an arrangement pitch of the nanostructures, and $\lambda$ denotes the preset wavelength According to another aspect of the inventive concept, there is provided an electronic apparatus including a light source generating source light, any one of the meta optical device described above, configured to form structured light from the source light and to illuminate an object, a first sensor and a second sensor spaced apart from each other with the meta optical device therebetween and configured to detect light reflected from the object, and a processor configured to analyze signals detected from the first sensor and the sensor and calculating depth information about the object.

The electronic apparatus may further include an image display unit that displays an image, wherein the processor is further configured to generate a depth image from the depth information, generate an additional image related to the depth image, and control the image display unit to display the depth image and the additional image.

The electronic apparatus may include an eye-wearable device.

BRIEF DESCRIPTION OF THE DRAWINGS

Embodiments will be more clearly understood from the following detailed description taken in conjunction with the accompanying drawings in which:

FIG. 1 is a flowchart of a meta optical device design method according to an embodiment;

FIG. 2 is a flowchart of a detailed process of setting a phase profile for structured light having a high viewing angle in the meta optical device design method according to an embodiment;

DETAILED DESCRIPTION OF THE EMBODIMENTS

Figure 3A:
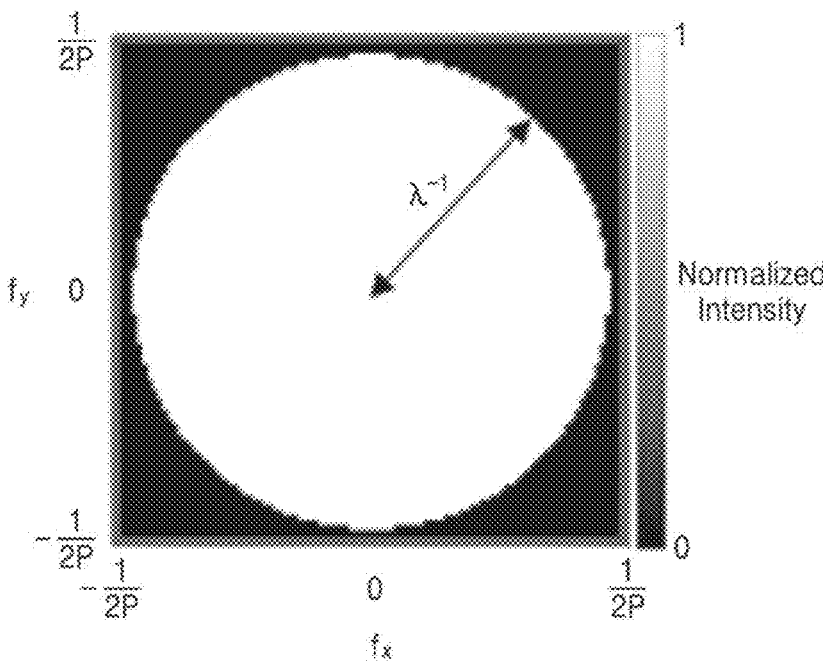
FIG. 3A is a view illustrating a first function defined in the spatial frequency domain, according to an embodiment of the meta optical device design method.

Hereinafter, various embodiments of the inventive concept are described in detail with reference to the accompanying drawings. The described embodiments are merely exemplary, and various modifications are possible from the embodiments. In the following drawings, the same reference numerals denote the same components, and the size of each component in the drawings may be exaggerated for clarity and convenience of explanation.

Hereinafter, what is described as "upper" or "above" may include not only what is directly above in contact but also what is above in non-contact.

The terms such as first and second may be used to describe various components but are used only for the purpose of distinguishing one component from another. The terms do not limit the difference in material or structure of components.

The singular expressions may include plural expressions unless the context clearly dictates otherwise. In addition, when a certain part is "including" any component, this means that other components may be further included, rather than excluding other components unless otherwise stated.

In addition, the terms " . . . part" and "module" described in the specification refer to units that process at least one function or operation, which may be implemented as hardware or software or as a combination of hardware and software.

The use of the term "the above" and similar indicative terms may correspond to both singular and plural.

The operations constituting the method may be performed in an appropriate order unless there is an explicit mention that the operations should be performed in the order described. In addition, the use of all exemplary terms (e.g., etc.) is simply to explain technical ideas in detail, and the scope of rights is not limited by these terms unless they are limited by claims.

FIG. 1 is a flowchart of a meta optical device design method according to an embodiment.

The meta optical device may be a diffraction device including a nanostructure with a sub-wavelength dimension. The sub-wavelength refers to a value less than the wavelength of the incident light to be modulated, or a value less than the central wavelength of the wavelength band of the incident light. A shape and arrangement of nanostructures in the meta optical device may be set to modulate incident light into a desired shape. The sub-wavelength nanostructure may also be referred to as meta-atom, and the arrays in which the nanostructures are arranged may also be referred to as a meta surface.

The nanostructures may have a refractive index different from the surrounding material, and a refractive index distribution may be formed by the shape and arrangement of the nanostructures. The shape of the wavefront, which is a surface defined by connecting points with the same phase in the path of light, is different before and after undergoing the refractive index distribution, that is, the phase of light after the light has passed through the meta optical device may be different from the phase of light before the light is incident onto the meta optical device. The phase difference of light is expressed as a phase delay and may be shown as a phase delay profile having a distribution that depends on a position. Hereinafter, the phase by the meta optical device refers to a phase delay, that is, a relative phase with respect to the phase of the incident light before the incident light is incident onto the meta optical device, and the phase and phase delay may be interchangeably used. For example, phase, phase delay, phase delay profile, phase profile, phase distribution function, etc. may be used together with the same meaning.

The meta optical device may represent various optical performance according to the phase profile indicated by the meta optical device. In an embodiment, the meta optical device may be designed to have a phase profile capable of forming a structured light of a high viewing angle. The phase profile may implement a viewing angle of about 180° in a range of about −90° to about 90° in the vertical direction and the horizontal direction. However, the inventive concept is not limited thereto, and the phase profile may be designed to implement structured light of a desired viewing angle.

In the meta optical device design method according to an embodiment, a phase profile may be set up at first to form structured light having a high viewing angle (S100).

Then, for generating the set phase profile by using nanostructures, a phase delay value and a phase delay efficiency according to various shape parameters of the nanostructures may be analyzed (S200). The set phase profile may be generated by using nanostructures having a shape dimension of the sub-wavelength. In other words, the degree of phase delay of light passing through the nanostructure may be controlled by adjusting the shape parameters of the nanostructures. The shape parameters of nanostructures may also be related to the efficiency of delaying the phase as desired. According to the parameter data, details of the nanostructures to be applied to the meta optical device may be determined.

Then, the nanostructures having a shape suitable for a certain phase may be arranged at each position corresponding to the phase profile (S300).

Detailed descriptions about the meta optical device design method are described with reference to FIGS. 2 to 4.

FIG. 2 is a flowchart of a detailed process of setting a phase profile for structured light having a high viewing angle in the meta optical device design method according to an embodiment.

At first, a first function may be defined and set in the spatial frequency domain (S110). FIG. 3A is a view illustrating a first function defined in the spatial frequency domain, according to an embodiment of the meta optical device design method. The first function is a function set up in the spatial frequency domain in such a manner that light of various diffraction orders capable of propagating may have uniform intensity. The first function may be defined to have a value of 1 within a circle with radius $1/\lambda$ and a value of 0 in the remaining space in the maximum resolvable spatial frequency domain that is a spatial frequency domain defined by (fx, fy) satisfying the conditions $1/(2P) \leq fx \leq 1/(2P)$, $1/(2P) \leq fy \leq 1/(2P)$. Herein, the Greek letter $\lambda$ denotes the wavelength of the incident light and the capital letter P denotes the pixel pitch of the spatial domain corresponding to the arrangement pitch of the nanostructures that is to be arranged in the spatial domain.

Figure 3B:
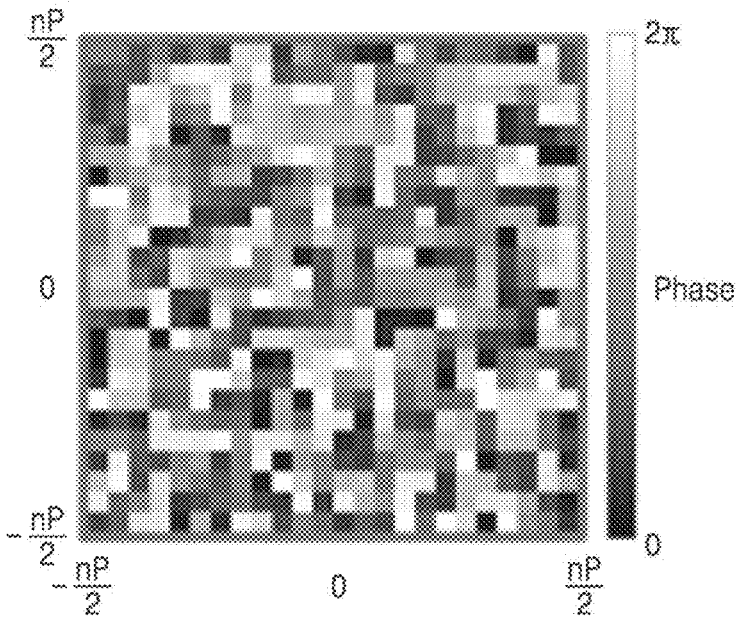
FIG. 3B is a view illustrating a second function obtained by Fourier transform of the first function in the spatial frequency domain, according to an embodiment of the meta optical device design method.

Next, the first function may be transformed by Fourier transform, to thereby set up a second function that is a unit phase distribution (S120). The unit phase distribution refers to a phase profile by a super cell that is a basic unit to be repeatedly arranged in the spatial domain. FIG. 3B is a view illustrating a second function obtained by the Fourier transform of the first function in a spatial frequency domain, according to an embodiment of the meta optical device design method. An iterative Fourier transform algorithm (IFTA) may be used for the Fourier transform described above. Referring to FIG. 3B, assuming that a single super cell is made up of a plurality of pixels which are arranged in an n×n matrix with a pixel pitch P, a plurality of phase values may be assigned at each position of the spatial domain corresponding to the super cell in a range of about 0 to about $2\lambda$.

Then, by the convolution of the second function and a supercell arrangement function, the phase profile that is applied to the entire spatial domain may be generated (S140).

Figure 3C:
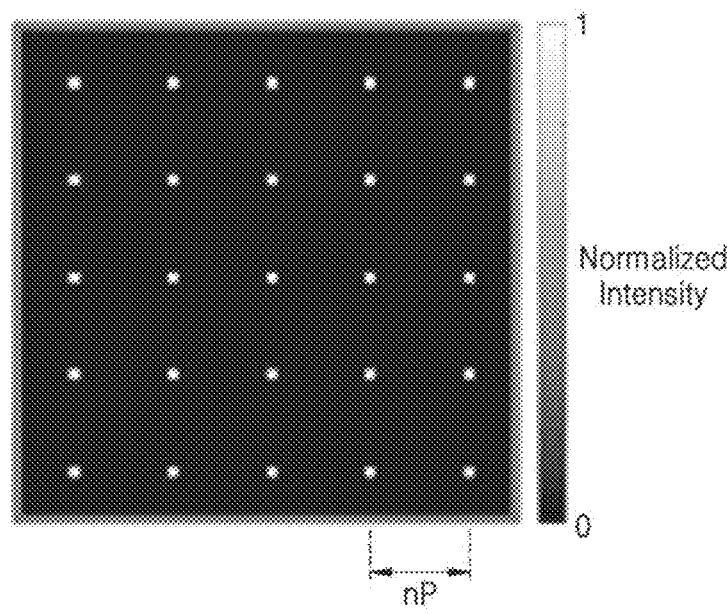
FIG. 3C is a view illustrating a function that defines a supercell array used in the meta optical device design method according to an embodiment.
Figure 3D:
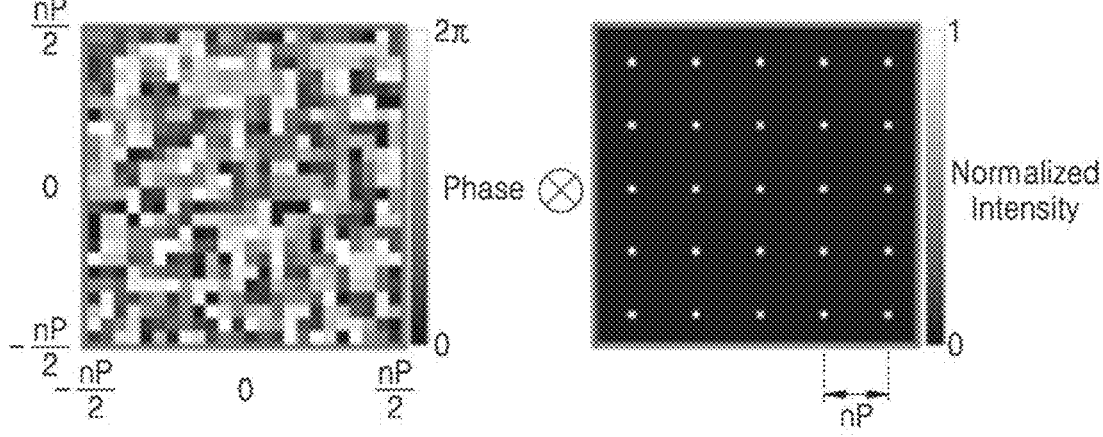
FIG. 3D is a view illustrating an operation for generating a phase profile to be applied to the entire spatial domain, according to the embodiment of the meta optical device design method.
Figure 3E:
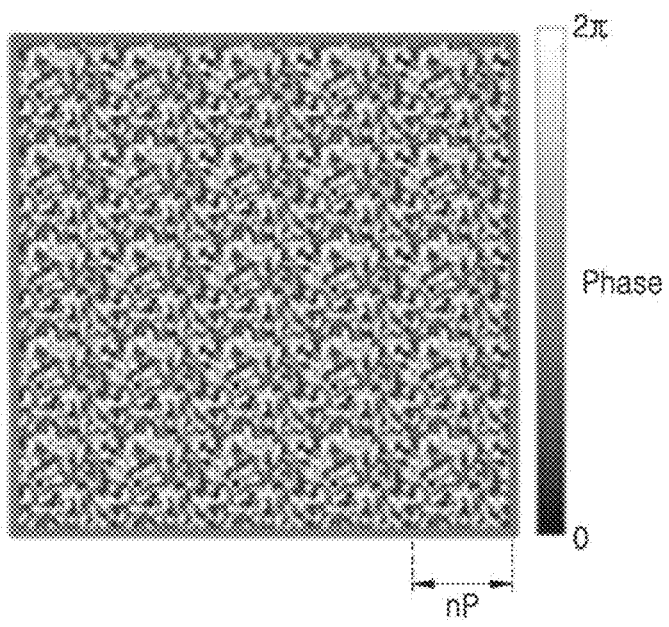
FIG. 3E is a view illustrating a phase profile generated, according to an embodiment of the meta optical device design method.

FIG. 3C is a view illustrating a function that defines the supercell array used when performing the meta optical device design method according to an embodiment, and FIG. 3D is a view illustrating an operation for generating a phase profile to be applied to the entire spatial domain, according to the embodiment of the meta optical device design method. FIG. 3E is a view illustrating the phase profile generated, according to an embodiment of the meta optical device design method.

The supercell arrangement function shown in FIG. 3C may be represented by a 2D Dirac comb function. Referring to FIG. 3C, the supercell arrangement function may be represented by a plurality of supercells that are arranged in N×N matrix with an arrangement pitch of nP. The phase profile shown in FIG. 3E may be generated by an operation of convolution shown in FIG. 3D. A plurality of phase values, which are to be implemented on the entire spatial domain, that is, on each position of the meta surface, may be set according to the generated phase profile.

The phase profile shown in FIG. 3E may be implemented in various forms of meta surfaces, that is, the shapes and arrangements of the nanostructures. Hereinafter, a meta optical device of which the meta surface is implemented by the phase profile is provided, but the meta optical device according to an embodiment is not limited to the illustrated structure. In other words, the phase profile shown in FIG. 3E may be implemented in various ways other than the shape and arrangement of the nanostructures illustrated below.

Figure 4:
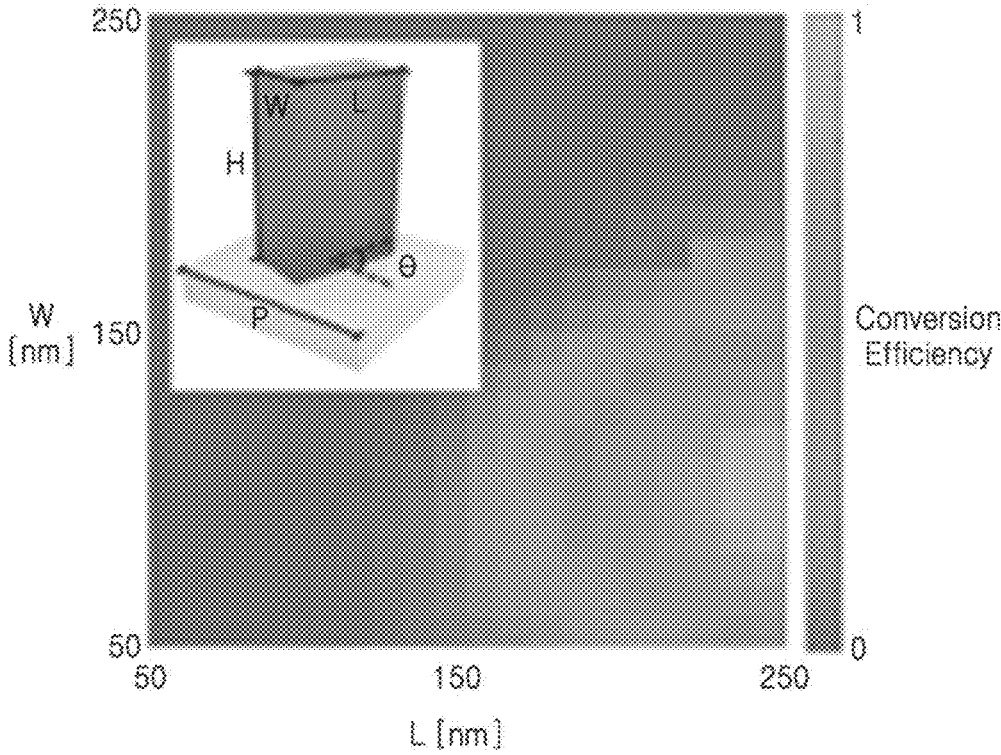
FIG. 4 is a view illustrating shape parameters of a nanostructure be applied to a meta optical device and the efficiency according to the shape parameters, according to an embodiment of the meta optical device design method.

FIG. 4 is a view illustrating shape parameters of a nanostructure to be applied to a meta optical device and an efficiency according to the shape parameters, according to an embodiment of the meta optical device design method.

There is a method called as geometric phase or Pancharatnam-Berry (PB) phase in which the meta-atoms making up the meta-surface controls the phase. According to the method, the phase of light passing through the meta-atom may be adjusted by twice the rotation angle θ of the meta-atom.

$$E_{out} = \frac{t_i + t_s}{2}\begin{bmatrix} 1 \\ \mp i \end{bmatrix} + \frac{t_i - t_s}{2}e^{\pm i2\theta(x,y)}\begin{bmatrix} 1 \\ \pm i \end{bmatrix}$$

In this case, since the phase adjustment occurs when circularly polarized light is converted from left to right (or right to left), the efficiency for implementing the desired phase adjustment is higher as the conversion efficiency (CE) of circularly polarized light is higher. To increase the efficiency, a method of finding L and W may be used by a rigorous coupled wave analysis (RCWA) in such a manner that the term $(t_i-t_s)/2$ is maximized, wherein $t_i$ and $t_s$ denote the complex transmission coefficients in the long axis and short axis directions of the meta-atom, respectively. For example, a high conversion efficiency of 0.88 may be obtained when P=300 nm, H=475 nm, L=250 nm, and W=110 nm. However, the numerical values are exemplary, and detailed parameters for increasing the conversion efficiency may be changed according to the detailed shape of the meta-atom and the relationship between the meta-atom and the surrounding material.

As described above, the arrangement angle θ of the nanostructure with which the shape parameter is set up, may be adjusted as a relationship of Φ(x, y)=2θ(x, y), and then, the nanostructures may be positioned on the spatial domain.

Although the nanostructure is shaped into a rectangular parallel pipe in FIG. 4, the nanostructure is not limited thereto and may have various cross-sectional shapes of nanopillar such as an oval column as long as a long axis and a short axis are defined.

Figure 5A:
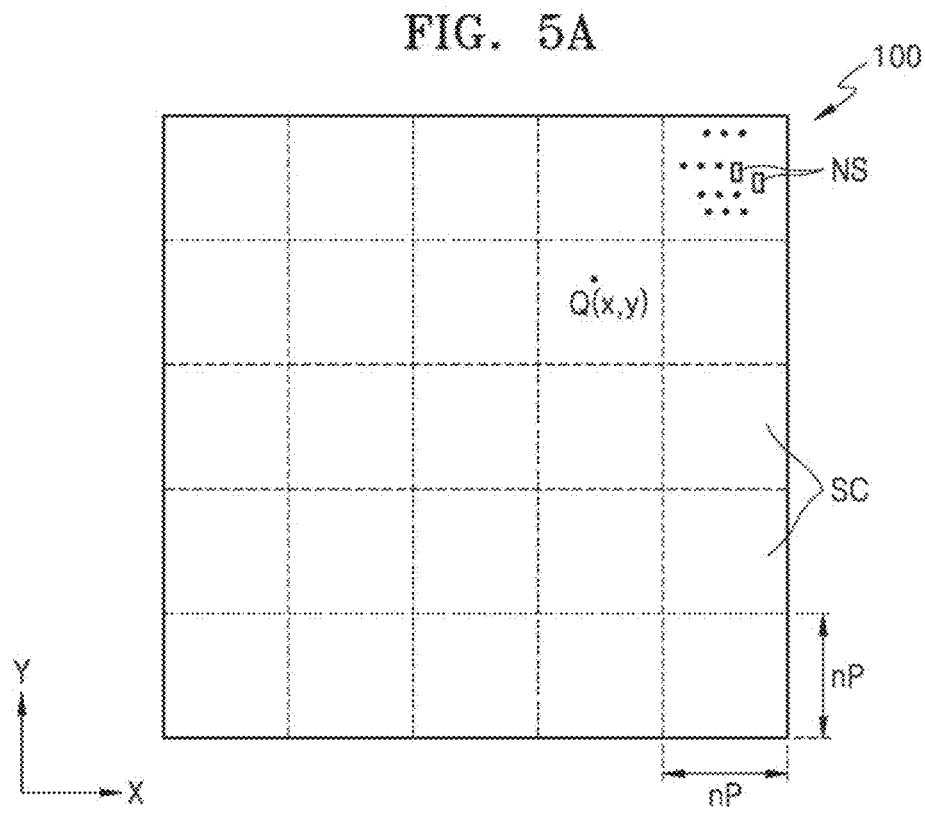
FIGS. 5A and 5B are a plan view and a cross-sectional view, respectively, illustrating a schematic structure of a meta optical device according to an embodiment.
Figure 5B:
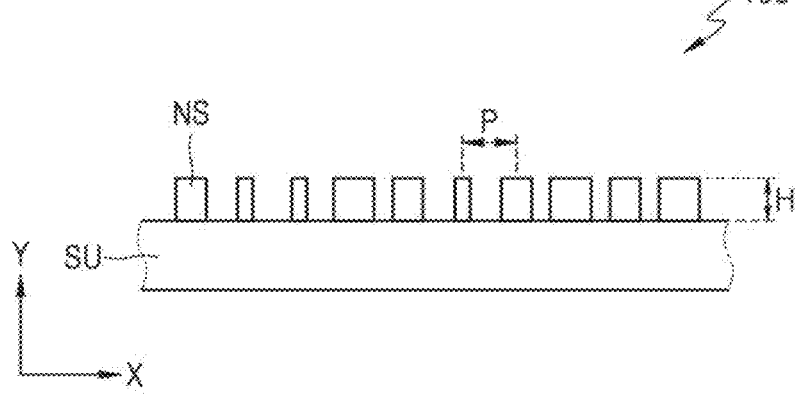

FIGS. 5A and 5B are a plan view and a cross-sectional view, respectively, illustrating a schematic structure of a meta optical device according to an embodiment.

Referring to FIGS. 5A and 4B, a meta optical device 100 according to an embodiment may include a plurality of supercells SC and each of the supercells SC may include a plurality of nanostructures NS. The plurality of nanostructures NS may be provided in such a configuration that the nanostructure is supported by a support layer SU. Some of the plurality of nanostructures NS may be shown and the entire nanostructures may be omitted in figures. The nanostructure NS located at an arbitrary position Q(x, y) may have a rectangular parallelepiped shape in which a width, a length, and a height are defined and a preset conversion efficiency, and may be arranged in such a configuration that the arrangement angle θ of the long axis of the cross-sectional nanostructure is Φ(x, y)/2 according to the phase value Φ(x, y) that is to be implemented at the position Q(x, y).

The arrangement pitch P of the nanostructures NS, which is a distance between centers of the neighboring nanostructures NS, may be set to be λ/2 or less.

The nanostructure NS may be a material having a refractive index different from that of a surrounding material, and may be formed of, for example, a material having a refractive index higher than that of the surrounding material. For example, the nanostructure NS may include crystalline silicon (c-Si), polycrystalline silicon (p-Si), amorphous silicon (a-Si), and III-V compound semiconductors (e.g., gallium phosphide (GaP), gallium nitride (GaN), gallium arsenide (GaAs), etc.), silicon carbide (SiC), titanium oxide (TiO2), silicon nitride (SiN), and/or combinations thereof.

The nanostructure NS may include a nanocomposite including a resin material and nanoparticles dispersed in the resin material. The resin material may include an ultraviolet (UV) curable resin, and the nanoparticles may include silicon (Si) nanoparticles, titanium oxide (TiO2) nanoparticles, and other nanoparticles made of various materials described above. Thus, the meta optical device may be manufactured by a soft mold using the nanocomposite. In this case, the nanostructures NS may be well formed on the support layer of various shapes and materials, for example, on a curved plastic layer in the desired shape and arrangement.

The material around the nanostructure NS may include a dielectric material having a refractive index different from the nanostructure NS, for example, lower than that of the nanostructure NS. For example, the surrounding material may include silicon oxide (SiO2) or air.

The support layer SU may include any one of glass (fused silica, BK7, etc.), quartz, polymer (polymethyl methacrylate (PMMA), SU-8, etc.), plastic, and a semiconductor substrate. The support layer SU may include a material having a refractive index lower than that of the nanostructure NS. However, the support layer SU is not limited thereto.

The material, shape, and arrangement of the nanostructure NS in the meta optical device 100 according to an embodiment may be set up suitable for the phase profile by which the structured light of a wide viewing angle is formed. For example, as described above, the first function in the spatial frequency domain may be defined in such a way that various propagating beams diffracted from light with different diffraction orders have a uniform intensity, and the structured light implemented by the phase profile calculated from the first function may have a viewing angle of about 180° in the horizontal and vertical directions. However, the phase adjustment efficiency by the nanostructures NS used for the phase profile may not 100%, so the meta optical device 100 may have a viewing angle less than or equal to about 180°. The meta optical device 100 may generate, for example, the structured light having a viewing angle greater than or equal to about 160° in the horizontal and vertical directions.

The structured light generated in the meta optical device 100 may have a regular dot pattern. However, the inventive concept is not limited thereto, and the structured light may be modified to have a preset dot pattern in a modified embodiment.

The meta optical device 100 may generate ±1st to ±$m^{th}$ diffraction light. Herein, the small letter m denotes the largest number among the integers less than (n*P/λ) when the nanostructures NS are arranged in an n×n matrix at an arrangement pitch P in a single supercell SC.

Since the phase profile applied to the design of the meta optical device 100 is set in such a way that various beams diffracted from light with different diffraction orders have a uniform intensity as described above, all the beams diffracted from light with all diffraction orders by the meta optical device 100 may have a uniform intensity theoretically. However, when the phase profile, which is already set up, is implemented into the nanostructure NS, the implementation of the phase profile may not be performed with 100% accuracy, and thus, the nanostructure NS may have a design error or a manufacturing error. When light is diffracted in the meta optical device 100, the ratio of the intensity of the highest order diffraction light, for example, the $m^{th}$ order diffraction light, with respect to the intensity of the first order diffraction light may be 20% or more, 30% or more, 40% or more, or 50% or more.

Figure 6:
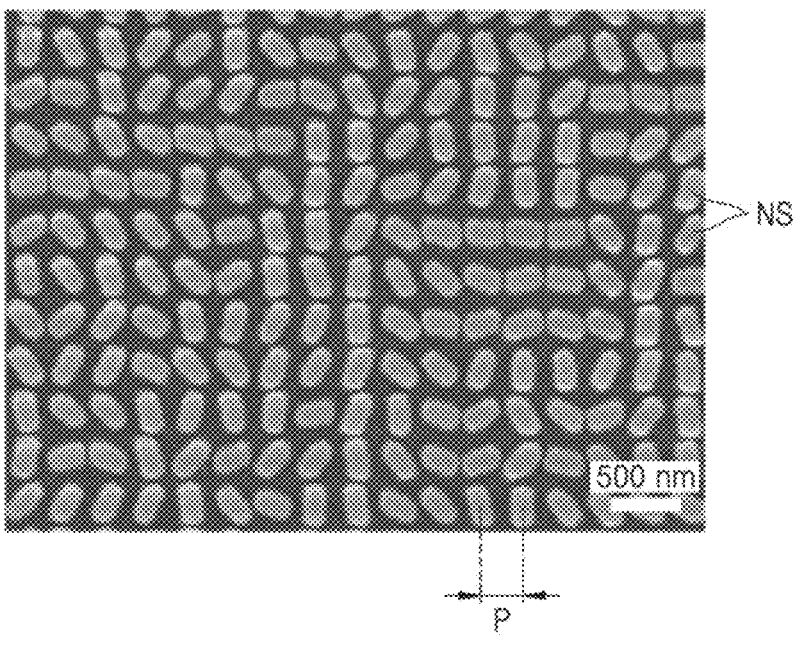
FIG. 6 is a micrograph showing a meta optical device manufactured by a meta optical device design method according to an embodiment.

FIG. 6 is a micrograph showing a meta optical device manufactured by a meta optical device design method according to an embodiment.

The micrograph in FIG. 6 confirms that the meta optical device implements a structured light having a viewing angle of about 180° with diffraction efficiency of about 60% or more.

Figure 7:
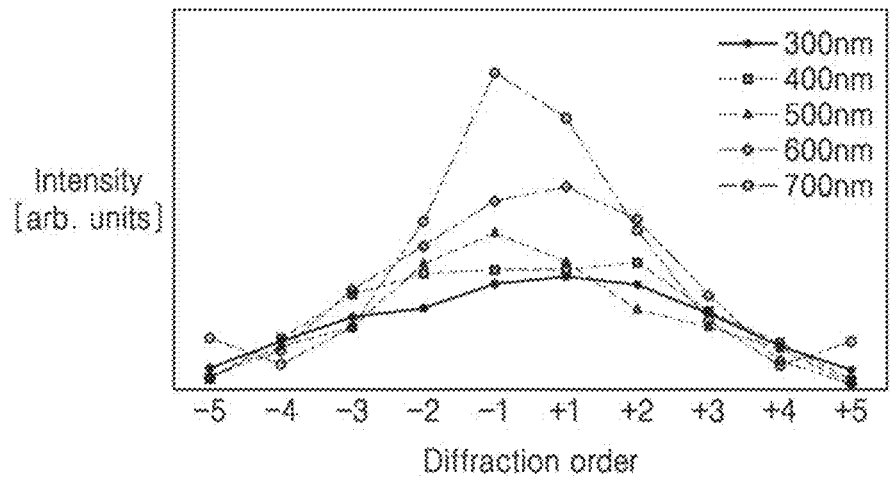
FIG. 7 is a graph showing the intensity of diffraction light in relation with the diffraction order at each arrangement pitch of a nanostructure in the meta optical device according to an embodiment.

FIG. 7 is a graph showing the intensity of diffraction light in relation with the diffraction order at each arrangement pitch of the nanostructure in the meta optical device according to an embodiment.

The graph in FIG. 7 shows the intensity of diffraction light in relation with the diffraction order when the pixel pitch, that is, the arrangement pitch P of the nanostructure is 300 nm, 400 nm, 500 nm, 600 nm, or 700 nm. In this case, an integer n of the n×n matrix in which the nanostructures are arranged in each supercell may be set to 12, 9, 7, 6, and 5, so that the highest diffraction order may be the same as ±5 in each case of n. The graph shows that as the arrangement pitch P increases, the intensity of the higher order diffraction light decreases rapidly. When the arrangement pitch P is 300 nm that is less than $\lambda/2$, the intensity ratio of the fifth order diffraction light with respect to the first order diffraction light is shown highest.

Figure 8:
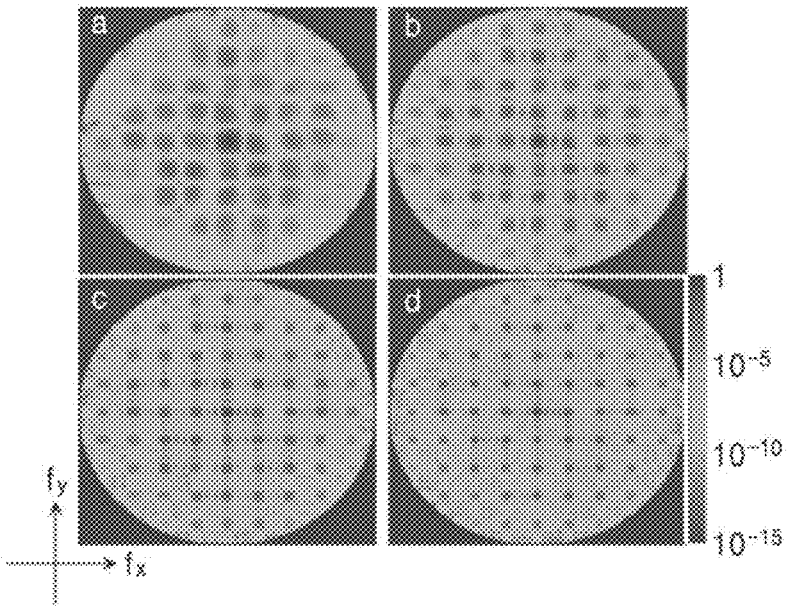
FIG. 8 is a view illustrating a plurality of distribution diagrams of structured light in the spatial frequency domain in each case where the number of supercells is different in the meta optical device according to an embodiment.

FIG. 8 is a view illustrating a plurality of distribution diagrams of the structured light in a spatial frequency domain in each of cases where the number of supercells is different from another in the meta optical device according to an embodiment.

In FIG. 8, in each of the cases denoted by a, b, c, and d, respectively, an integer N of N×N matrix in which the supercells are arranged is 2, 3, 4, and 5, respectively, the pixel pitch is 300 nm, and the number of the nanostructures is 10×10 in a single supercell of each case. While the number of the nanostructures and the pixel pitch are related with the diffraction angle, the number of the supercells may be related with the diameter of the diffraction beam, that is, the angle cone, and may have no effect on the diffraction angle. As the integer N increases, the diameter of the diffraction beam decreases and the distribution of the structured light is uniform.

Figure 9:
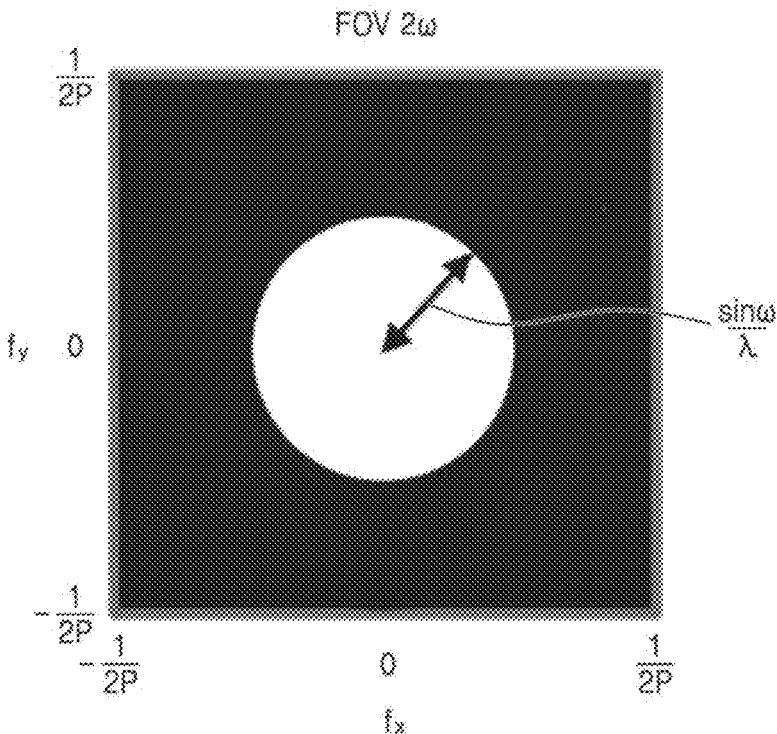
FIG. 9 is a view illustrating another example of the first function defined in the spatial frequency domain, according to an embodiment of the meta optical device design method.

FIG. 9 is a view illustrating another example of the first function defined in the spatial frequency domain, according to an embodiment of the meta optical device design method. The first function shown in FIG. 3A is provided for deriving the phase profile for implementing a viewing angle of 180°, but another example of the first function in this embodiment is provided for implementing an arbitrary viewing angle of 2ω.

The first function shown in FIG. 9 may be defined to have a value of 1 within a circle with radius $(\sin \omega)/\lambda$ and a value of 0 in the remaining space in the spatial frequency domain defined by (fx, fy) satisfying the conditions $1/(2P)\leq fx\leq 1//(2P)$, $1/(2P)\leq fy\leq 1/(2P)$. Herein, the capital letter P denotes an arrangement pitch of the nanostructures, the Greek letter $\lambda$ denotes a wavelength of incident light that is to be modulated, and the Greek letter ω denotes an arbitrary value less than or equal to $\pi/2$ (radian).

After setting the first function in this way, a phase profile, which is to be applied to the spatial domain (meta surface domain), may be derived in the same way as described with reference to FIGS. 3B to 4, and a plurality of nanostructures suitable for each position may be arranged, thereby implementing a meta optical device capable of representing a desired viewing angle of 2ω.

Figure 10:
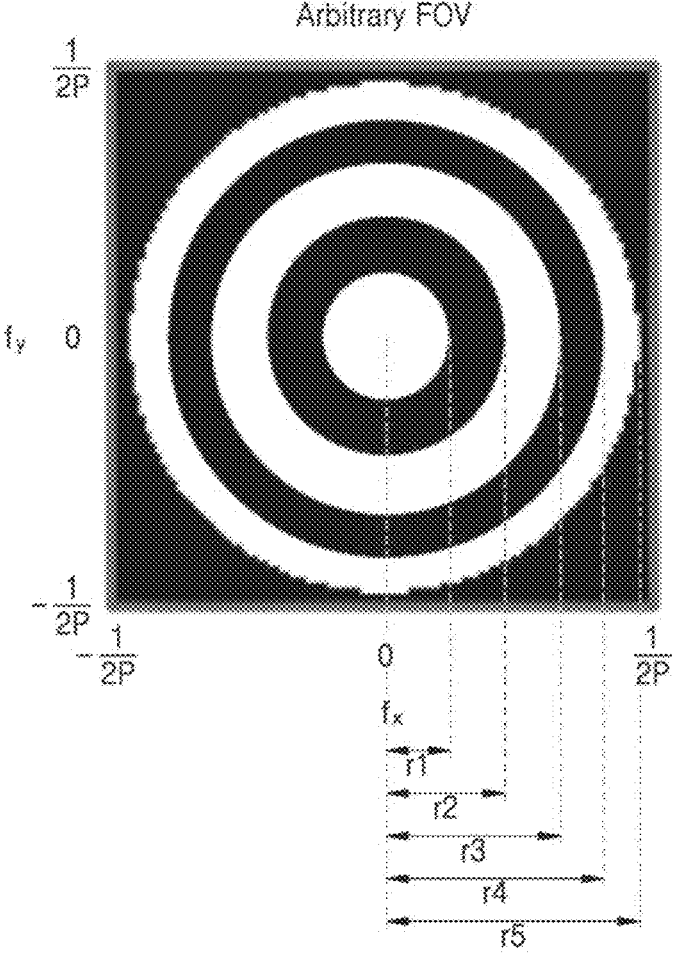
FIG. 10 is a view illustrating another example of the first function defined in the spatial frequency domain, according to an embodiment of the meta optical device design method.

FIG. 10 is a view illustrating another example of the first function defined in the spatial frequency domain, according to an embodiment of the meta optical device design method.

The first function in this embodiment may be provided for deriving a phase profile for representing a viewing angle of an arbitrary shape. As shown in FIG. 10, the first function may be set to have a value of 1 within a circle with radius r1, a value of 1 in an annular ring with an inner diameter of r2 and an outer diameter of r3, a value of 1 in an annular ring with an inner diameter of r4 and an outer diameter of r5, and a value of 0 in the remaining space in the spatial frequency domain defined by (fx, fy) satisfying the conditions $1/(2P)\leq fx\leq 1/(2P)$, $1/(2P)\leq fy\leq /(2P)$. In that case, r1 may be $(\sin \omega_1)/\lambda$, r2 may be $(\sin \omega_2)/\lambda$, the r3 may be $(\sin \omega_3)/\lambda$, r4 may be $(\sin \omega_4)/\lambda$, and r5 may be $(\sin \omega_5)/\lambda$. In addition, $\omega_1$ to $\omega_5$ satisfies the condition of $\omega_1 < \omega_2 < \omega_3 < \omega_4 < \omega_5 \leq \pi/2$, the capital letter P denotes the arrangement pitch of nanostructures, and the Greek letter $\lambda$ denotes the wavelength of incident light to be modulated.

A meta optical device may be designed by using the first function in such a manner that the structured light is formed in a range of the viewing angle $-\omega_1 \sim +\omega_1$, $-\omega_2 \sim -\omega_3$, $+\omega_2 \sim +\omega_3$, $-\omega_4 \sim -\omega_5$, $+\omega_4 \sim +\omega_5$ in the vertical and horizontal directions.

A value−1 area in which the first function is set to have a value of 1 is provided as a single circle and two annular rings, but is not limited thereto, and for example, the value−1 area is modified as a single circle and a single ring.

FIGS. 11A to 11D are views illustrating a method of manufacturing a meta optical device according to an embodiment.

Figure 11A:
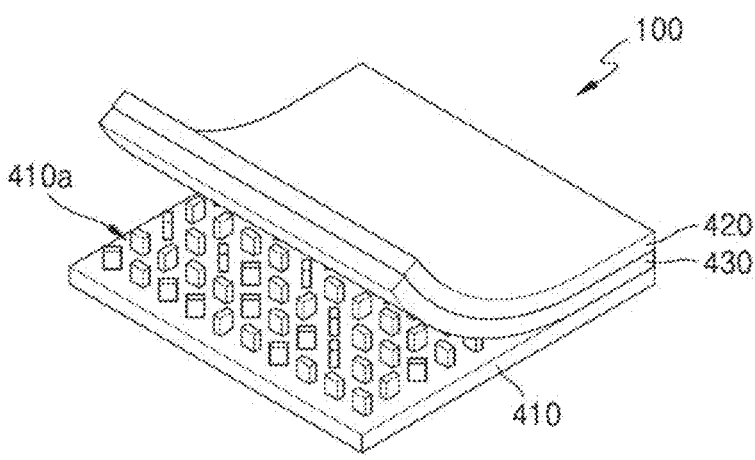
FIGS. 11A to 11D are views illustrating a method of manufacturing a meta optical device according to an embodiment.

FIG. 11A shows a process of forming a soft mold by duplicating a pattern 410a formed on a master stamp 410. The pattern 410a, which is embossing or engraved on the master stamp 410, may have a shape corresponding to the shape and arrangement of the nanostructures of the meta optical device that is to be manufactured. The master stamp 410 may be formed in accordance with the shape and arrangement of the nanostructures that are set up to form a desired phase profile, that is, structured light of a wide viewing angle. The pattern 410a of the master stamp 410 may be formed by, for example, an electron beam lithography process, etc. A mold material layer having a soft material may be compressed on the master stamp 410. The mold material layer may include a first layer 420 and a second layer 430. The second layer 430 making direct contact with the pattern 410a of the master stamp 410 may include a material having lower viscosity and higher mechanical rigidity than the first layer 420. For example, the first layer 420 may include hard polydimethylsiloxane (PDMS), and the second layer 430 may include hard polydimethylsiloxane (h-PDMS). However, this is an example of the mold material layer, and the mold material layer may include a single layer of a flexible material. The mold material layer may be placed on the master stamp 410, and then, heat or pressure may be applied to the mold material layer, to thereby imprint the pattern 410a of the master stamp 410 onto the second layer 430.

Figure 11B:
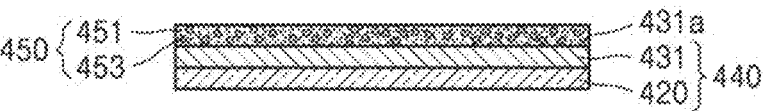

Referring to FIG. 11B, a nanocomposite 450 may be coated on a soft mold 440. The nanocomposite 450 may include a resin material 451 and nanoparticles 453 dispersed in the resin material 451. The soft mold 440 may include the first layer 420 and a patterned second layer 431. The pattern 410a of the master stamp 410 may be imprinted on the second layer 431, so that an imprinted pattern 431*a* may be formed on the second layer 431. Although detailed shapes of the imprinted pattern 431*a* is not shown in FIG. 11B, the imprinted pattern 431*a* may be a reverse pattern of the shape and arrangement of the nanostructures of the meta optical device that is to be manufactured. The resin material 451 in the nanocomposite 450 may include an UV curable resin that fills an inside of the engraved area of the imprinted pattern 431*a* in the form of an unhardened liquid.

Figure 11C:
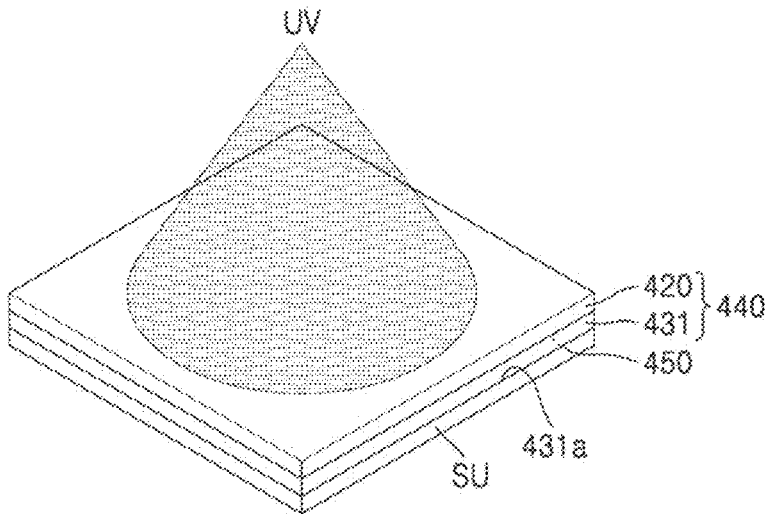

Referring to FIG. 11C, a support layer SU may be formed on the structure shown in FIG. 11B, and then, an ultraviolet rays UV may be irradiated onto the soft mold 440. A pressure may also be applied to the soft mold 440 together with the ultraviolet rays, if necessary. Thus, the resin material 451 of the nanocomposite 450 may be hardened. The support layer SU may include a flat substrate or may have a curved shape.

Figure 11D:
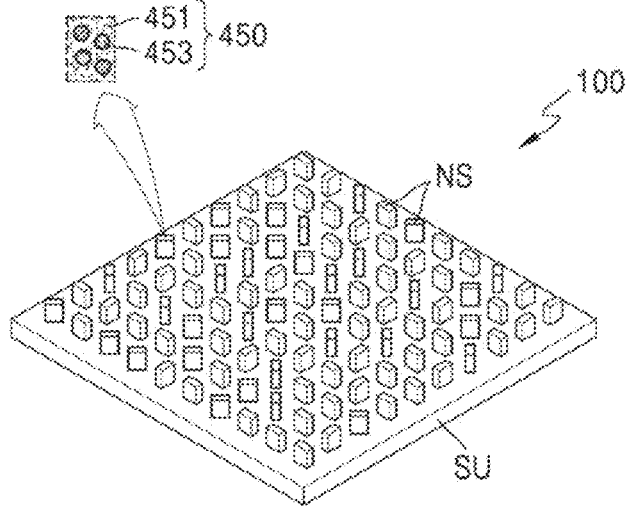

Thereafter, when the soft mold 440 is removed, as shown in FIG. 11D, the meta optical device 100 having the nanostructures NS on the support layer SU, formed of the nanocomposite 450 including the resin material 451 and the nanoparticles 453 dispersed in the resin material 451, and having a desired shape and arrangement is provided.

According to the manufacturing method described above, the soft mold 440 may be used repeatedly for manufacturing the meta optical device 100, which is advantageous for mass production of the meta optical devices 100. For example, the method of manufacturing the meta optical device 100 by using the electron beam lithography process usually takes a very long time and is very disadvantageous for mass production. However, in the manufacturing method according to an embodiment, a single master stamp 410 may be formed by an electron beam lithography process, the mold material layer may be formed on the master stamp 410, and the mold material layer may be hardened, to thereby form the soft mold 440 in a short time.

In addition, according to the manufacturing method described above, since the soft mold 440 may be used in forming the nanostructures NS, the nanostructures may be easily formed even on the support layer SU having a curved shape in a desired shape and arrangement. In other words, due to the flexible characteristics of the soft mold 440, the nanostructures NS may be well formed on the support layer SU regardless of the surface shape of the support layer SU.

Figure 12:
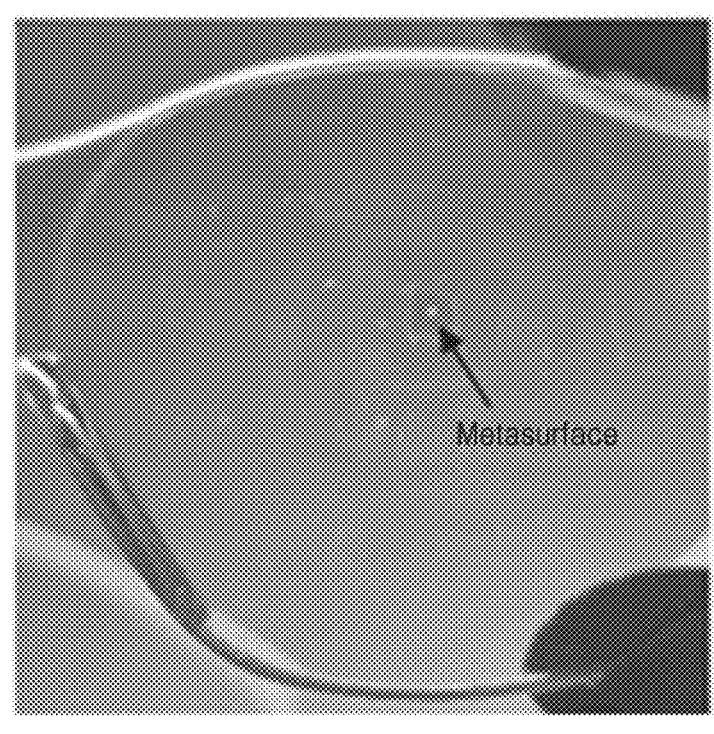
FIG. 12 is a photograph showing a meta optical device implemented based on a curved plastic according to an embodiment.

FIG. 12 is a photograph showing a meta optical device implemented based on a curved plastic according to an embodiment.

As shown in FIG. 12, a meta surface may be implemented on a curved transparent plastic that is provided as an eyeglass lens. Thus, the meta optical device 100 according to embodiment may be easily used in an eye-wearable electronic apparatus.

The meta optical device 100 according to an embodiment may be formed on various curved plastics and curved glasses. For example, the meta optical device 100 may be formed on a windshield or side mirror of a vehicle.

The meta optical device 100 according to an embodiment may form a structured light projector together with a light source. The structured light projector may be applied to a depth recognition apparatus together with sensors. The depth recognition apparatus may be used in various electronic apparatuses, for example, an autonomous driving device such as a vehicle, an autonomous vehicle, a robot, and a drone, a smart phone, a smart watch, a mobile phone, a personal digital assistant (PDA), a laptop computer, a personal computer (PC), various wearable devices, a virtual reality (VR) device, an augmented reality (AR) device, other mobile or non-mobile computing devices, and internet of things (IoT) devices, etc.

Figure 13:
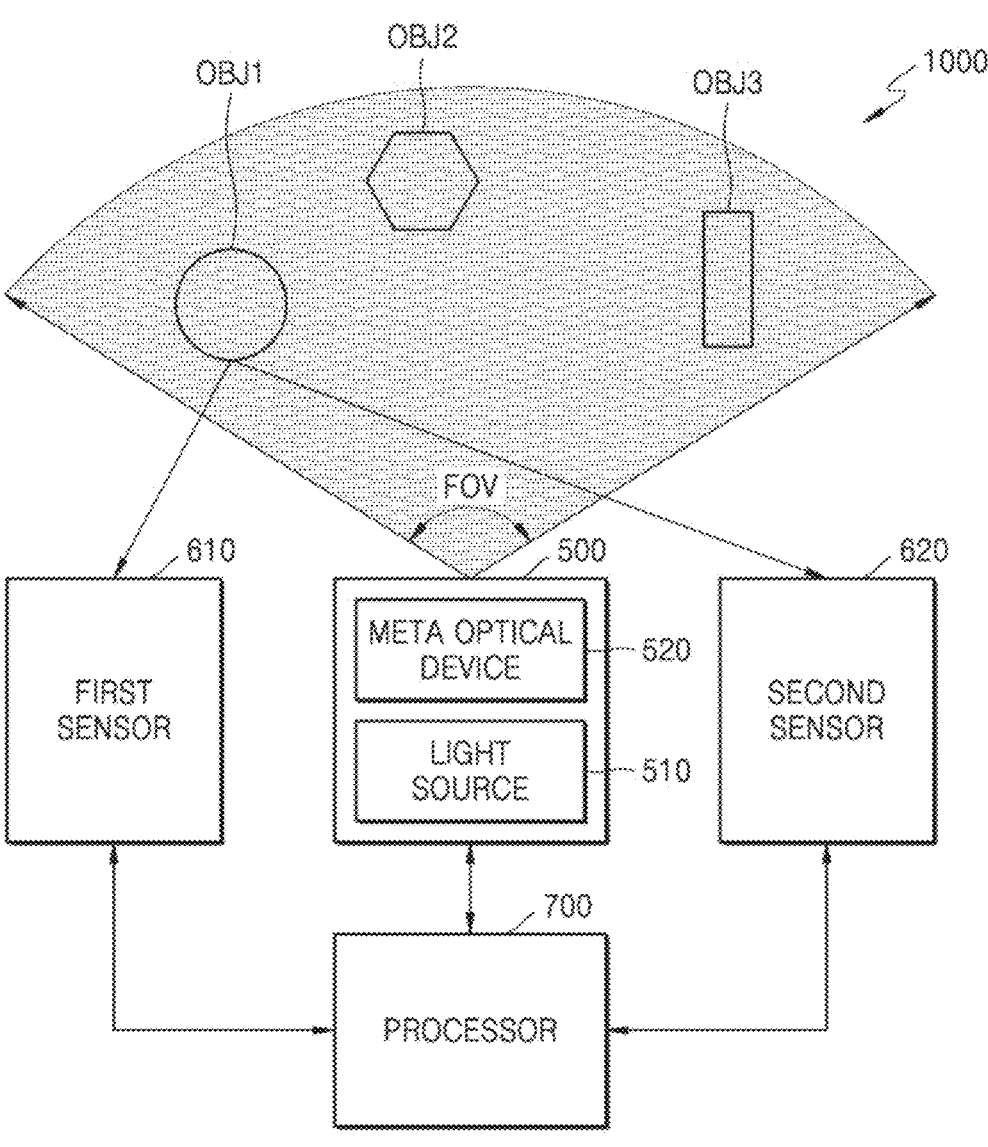
FIG. 13 is a view illustrating a schematic structure of an electronic apparatus according to an embodiment.

FIG. 13 is a view illustrating a schematic structure of an electronic apparatus according to an embodiment.

The electronic apparatus 1000 may include a depth recognition apparatus based on an active stereo vision. The electronic apparatus 1000 may include a structured light projector 500 irradiating structured light, a first sensor 610 and a second sensor 620 detecting light, and a processor 700 analyzing light detected by the first sensor 610 and the second sensor 620.

The structured light projector 500 may include a light source 510 for generating source light and a meta optical device 520 modulating the source light into the structured light. The light source 510 may include a light emitting diode (LED), a laser diode that emits laser light, and a vertical cavity surface emitting laser (VCSEL). The light source 510 may emit the source light such as near-infrared light, infrared light, and light in a visible light wavelength band. The wavelength of the source light emitted from the light source 510 may not be particularly limited and may be set up to emit light in a wavelength band suitable for applications utilizing the structured light. The meta optical device 520 may include the meta optical device 100 described above, and may be configured to form structured light of a wide viewing angle (FOV) according to the design method described above. The viewing angle of the structured light projector 500 may be, for example, in a range of about 160° to about 180° in the horizontal and vertical directions. However, the inventive concept is not limited thereto, and the structured light may have various forms of the viewing angles, as described in FIGS. 9 and 10. Accordingly, the structured light projector 500 may simultaneously illuminate a plurality of objects OBJ1, OBJ2, and OBJ3 that are arranged within the viewing angle.

The first sensor 610 and the second sensor 620 may include a photodetector that detects light and generates an electrical signal. Each of the first sensor 610 and the second sensor 620 may include an array of light detection elements. The first sensor 610 and the second sensor 620 may receive reflected light of the structured light irradiated to the objects OBJ1, OBJ2, and OBJ3. The first sensor 610 and the second sensor 620 may be provided to obtain information from different viewpoints at the objects OBJ1, OBJ2, and OBJ3. The first sensor 610 and the second sensor 620 may be positioned on both sides of the structured light projector 500 opposite to each other. The first sensor 610, the structured light projector 500, and the second sensor 620 may be arranged in series and spaced apart from each other by an appropriate distance. In the drawing, the structured light projector 500 is shown to be positioned between the first sensor 610 and the second sensor 620, but this is merely an example. The first sensor 610 may be positioned between the second sensor 620 and the structured light projector 500 or may be changed to a different arrangement.

The first sensor 610 and the second sensor 620 may be located at positions that are relatively different from the structured light projector 500, so that there are differences in the details of the reflected light detected from the objects OBJ1, OBJ2, and OBJ3.

The processor 700 may calculate depth information of the objects OBJ1, OBJ2, and OBJ3 by analyzing the reflected light received from the first sensor 610 and the reflected light received from the second sensor 620. For example, the reflected light reflected from the same position of the first object OBJ1 may be individually detected by the first sensor

610 and the second sensor 620, and the detected coordinate values on each image plane of the first sensor 610 and the second sensor 620 may be compared, to thereby calculate depth information on the corresponding position by a triangulation method. However, this is merely an example embodiment, and various methods may be used for calculating the depth information of the objects OBJ1, OBJ2, and OBJ3 may be used.

The electronic apparatus 1000 is shown to include the first sensor 610 and the second sensor 620, but the inventive concept is not limited thereto, and the electronic apparatus 1000 may be configured to obtain the depth information by only a single sensor depending on the pattern of the structured light that is formed by the structured light projector 500. The structured light having a preset pattern designed in advance may be irradiated to the objects OBJ1, OBJ2, and OBJ3, and the pattern changes occurring when the structured light is reflected from the objects OBJ1, OBJ2, and OBJ3 may be tracked down, to thereby extract the depth information of the subjects OBJ1, OBJ2, and OBJ3.

The electronic apparatus 1000 may obtain the depth information of the objects OBJ1, OBJ2, and OBJ3 by using only one of the first sensor 610 and the second sensor 620. Otherwise, the depth information of the objects OBJ1, OBJ2, and OBJ3 may be obtained with higher accuracy by using both the first sensor 610 and the second sensor 620.

In addition, the processor 700 may control the overall operation of the electronic apparatus 1000, for example, the operation of the first sensor 610 and the second sensor 620 and the operation of the light source 510 provided in the structured light projector 500.

The electronic apparatus 1000 may further include a memory. A programmed operation module and other data required for the operation may be stored in the memory, so that the processor 700 may perform operations for extracting 3-dimensional information on the objects OBJ1, OBJ2, and OBJ3 as described above.

A plurality of optical devices may be further arranged between the structured light projector 500 and the objects OBJ1, OBJ2, and OBJ3, and thus, the structured light emitted from the structured light projector 500 may be controlled to direct toward the objects OBJ1, OBJ2, and OBJ3 or may be further modulated by the optical devices. In addition, an additional optical device, such as a lens, may be further arranged on each of the first sensor 610 and the second sensor 620, to thereby collect the reflected light reflected from the objects OBJ1, OBJ2, and OBJ3.

Figure 14:
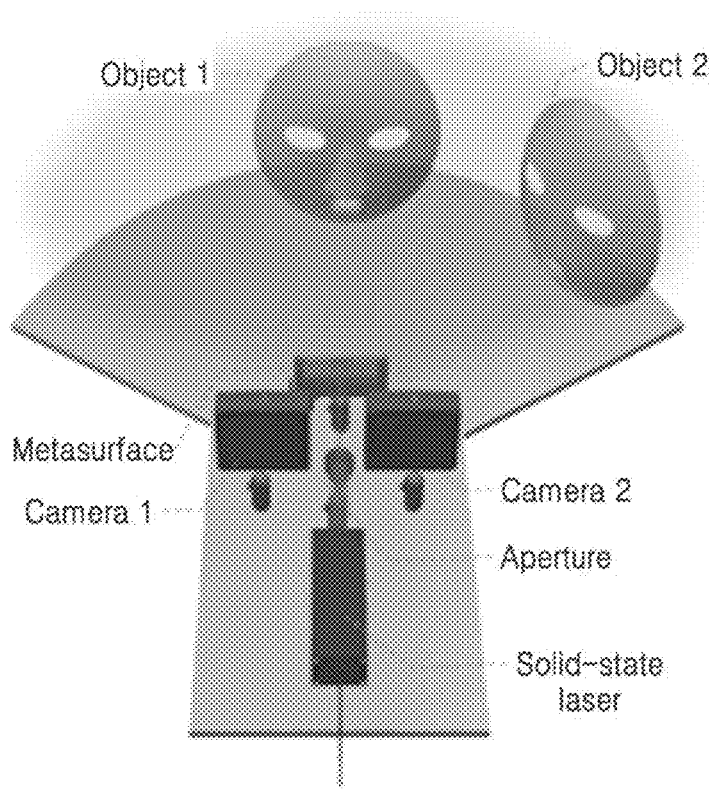
FIG. 14 is a view illustrating a structure of an empirical depth recognition system using the meta optical device according to an embodiment.
Figure 15A:
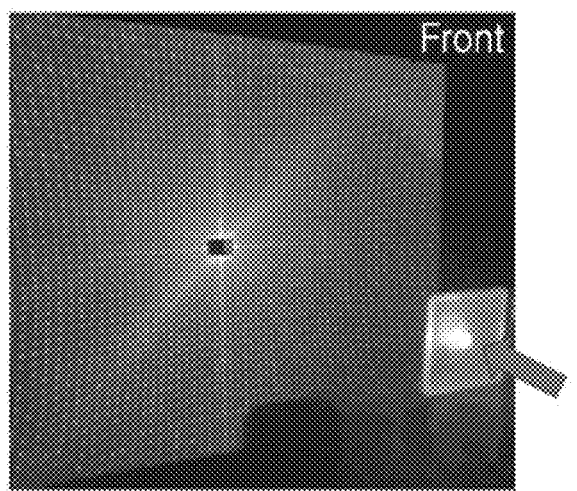
FIGS. 15A and 15B are photographs showing structured light formed in the depth recognition system shown in FIG. 14 from the front and the side.
Figure 15B:
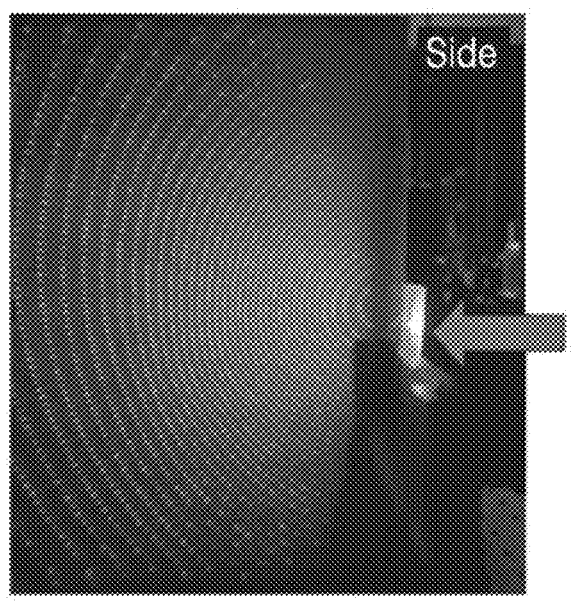
Figure 16:
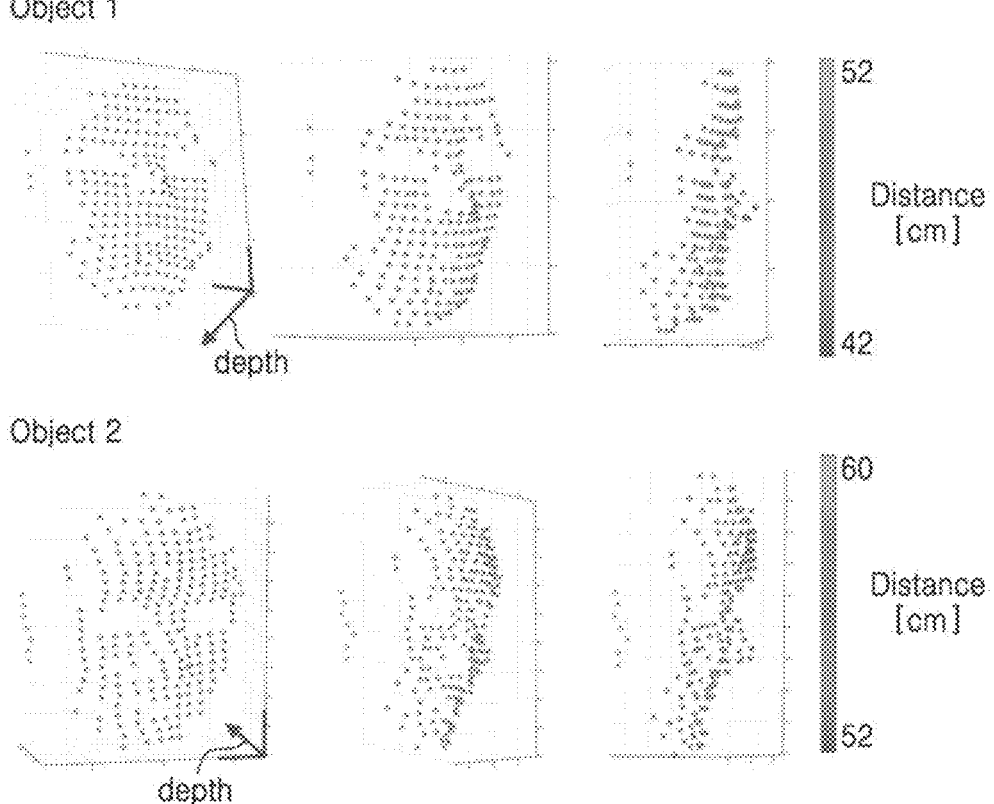
FIG. 16 is a depth map showing depths of two objects that are obtained by the depth recognition system shown in FIG. 14.

FIG. 14 is a view illustrating a structure of an empirical depth recognition system using the meta optical device according to an embodiment, FIGS. 15A and 15B are photographs showing structured light formed in the depth recognition system shown in FIG. 14 from the front and the side, and FIG. 16 is a depth map showing depths of two objects that are obtained by the depth recognition system shown in FIG. 14.

FIGS. 15A and 15B shows that laser light forms the structured light of a dot pattern having a viewing angle of about 180° by the meta surface. The structured light illuminates two objects object 1 and object 2 and images of two objects object 1 and object 2 are formed on two cameras, and then the depth information of the objects object 1 and object 2 are obtained from the images. A stereo matching method for finding the same point in the images of each camera uses a coherent point drift (CPD) algorithm to stochastically obtain an optimal matching condition. FIG. 16 shows the depth maps of the two objects object 1 and object 2 that are obtained as a result of an experiment conducted under the conditions described above.

The experiment confirms that the 3-dimensional image of the two objects Object 1 and Object 2, which are positioned in a wide viewing angle, may be well obtained by the depth recognition system using the meta optical device according to an embodiment.

Figure 17:
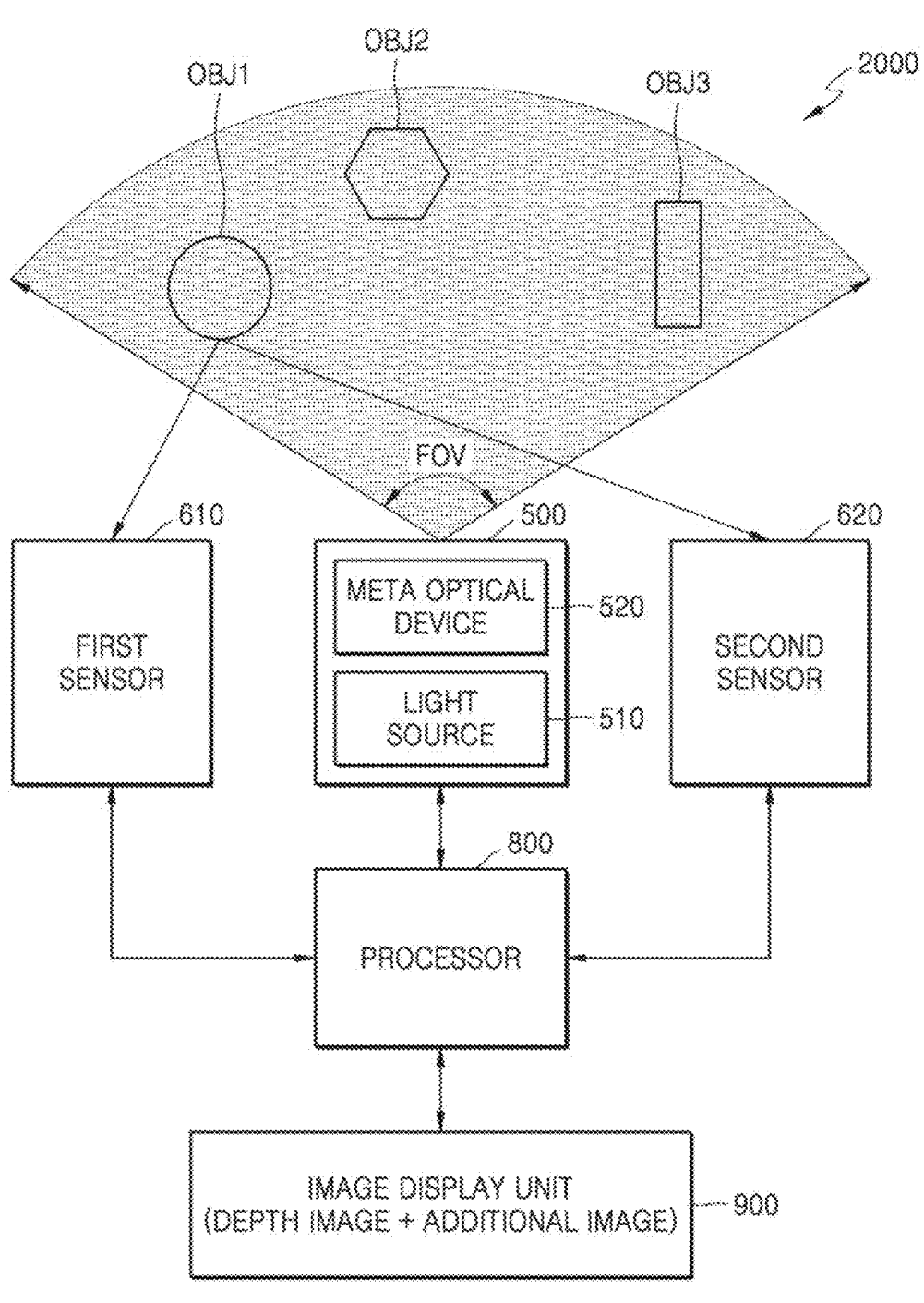
FIG. 17 is a view illustrating a schematic structure of an electronic apparatus according to another embodiment.

FIG. 17 is a view illustrating a schematic structure of an electronic apparatus according to another embodiment.

An electronic apparatus 2000 according to another embodiment may include an augmented reality device. The electronic apparatus 2000 may include a structured light projector 500 that irradiates structured light, a first sensor 610 and a second sensor 620 detecting light, and a processor 800 analyzing light detected by the first sensor 610 and the second sensor 620. The electronic apparatus 2000 may further include an image display unit 900 on which an image is displayed.

The image display unit 900 may include various conventional display devices, for example, a liquid crystal on silicon (LCoS) device, a liquid crystal display (LCD) device, an organic light emitting diode (OLED) display device, a digital micromirror device (DMD), and a next-generation display device such as a micro LED, quantum dot (QD) LED, etc.

The processor 800 may process the optical signals detected by the first sensor 610 and the second sensor 620 to obtain the depth information on the objects OBJ1, OBJ2, and OBJ3, similar to the processor 700 of the electronic device 1000 shown in FIG. 13. In addition, the processor 800 may control the image display unit 900 to process the depth information obtained for the objects OBJ1, OBJ2, and OBJ3 as a depth image and display the depth image on the image display unit 900, and also may control the image display unit 900 to display an additional image related to the obtained depth image on the image display unit 900.

The electronic apparatus 2000, which is an augmented reality device, may be implemented as a wearable device such as a glasses type, a head mount type, a goggle type, etc. The electronic apparatus 2000 may be implemented as a non-wearable device or may be provided in a driving apparatus such as a vehicle. For example, the augmented reality device may be applied to the front glass of the vehicle to reconstruct the surrounding environments in the driver's field of view into a depth image, that is, a 3-dimensional image, and provide the driver with a related additional image. Otherwise, a structural part of the augmented reality device, for example, the structured light projector 500, may be provided at other locations such as a side surface, a rear surface, etc., of the vehicle, and the depth information on the surrounding environments in the blind spot of the driver may be obtained, and then, the depth information may be reconstructed into a depth image to be provided to the driver together with the related additional image.

The meta optical device, a design method thereof, a manufacturing method thereof, and an electronic apparatus including the meta optical device have been described with reference to embodiments shown in the drawings, but this is merely an example, and various modifications and other equivalent embodiments are possible therefrom by those skilled in the art. Therefore, the disclosed embodiments should be considered from an explanatory point of view rather than a limiting point of view. The scope of the present specification is shown in the scope of claims, not the description described above, and all differences within the equivalent scope should be interpreted as included.

While the inventive concept has been particularly shown and described with reference to embodiments thereof, it will be understood that various changes in form and details may be made therein without departing from the spirit and scope of the following claims.

What is claimed is:

1. A meta optical device for forming structured light by modulating incident light having a preset wavelength, the meta optical device comprising:

a plurality of supercells each including a plurality of nanostructures each having a shape dimension less than the preset wavelength, wherein shapes and arrangements of the plurality of nanostructures are configured to form the structured light of a point pattern having a viewing angle greater than 160° in horizontal and vertical directions, wherein the shapes and the arrangements of the plurality of nanostructures are designed such that a ratio of an intensity of an $m^{th}$ order diffraction light with respect to an intensity of a first order diffraction light is greater than 50%, and wherein, m denotes a largest number of integers less than ($n*P/\lambda$), n denotes a number of the nanostructures in each of the supercells, P denotes an arrangement pitch of the nanostructures in each of the supercells, and $\lambda$ denotes the preset wavelength.

2. The meta optical device of claim 1, wherein an arrangement pitch of the plurality of nanostructures is less than or equal to $\lambda/2$ ($\lambda$ denotes the preset wavelength).

3. The meta optical device of claim 1, wherein each of the plurality of nanostructures is shaped into a column having a cross-sectional surface defined by a major axis and a minor axis, and a direction of the major axis of each of the plurality of nanostructures is determined by a relative position of the nanostructure in each of the plurality of supercells.

4. The meta optical device of claim 1, further comprising a support layer supporting the plurality of nanostructures.

5. The meta optical device of claim 4, wherein each of the plurality of nanostructures includes a nanocomposite having a resin material and nanoparticles dispersed in the resin material.

6. The meta optical device of claim 5, wherein the meta optical device is manufactured by using a soft mold having a reverse pattern of the shapes of the plurality of nanostructures.

7. The meta optical device of claim 5, wherein the support layer includes a transparent plastic material having a curved shape.

8. A meta optical device for forming structured light by modulating incident light having a preset wavelength, the meta optical device comprising:

a plurality of supercells each including a plurality of nanostructures each having a shape dimension less than the preset wavelength, wherein shapes and arrangements of the plurality of nanostructures are configured to form the structured light of a point pattern having a viewing angle greater than 160° in horizontal and vertical directions, wherein a phase profile generated by each of the plurality of supercells is represented as a second function that is obtained by an iterative Fourier transform of a first function defined in a spatial frequency domain, wherein the first function is defined to have a value of 1 within a circle with radius $1/\lambda$ and a value of 0 in a remaining space in the spatial frequency domain defined by (fx, fy) satisfying conditions $1/(2P) \le fx \le 1/(2P)$, $1/(2P) \le fy \le 1/(2P)$, and wherein P denotes an arrangement pitch of the nanostructures and $\lambda$ denotes the preset wavelength.

* * * * *